(12) United States Patent
Ray et al.

(10) Patent No.: US 7,844,087 B2
(45) Date of Patent: Nov. 30, 2010

(54) METHOD FOR SEGMENTATION OF LESIONS

(75) Inventors: Lawrence A. Ray, Rochester, NY (US); Richard A. Simon, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1013 days.

(21) Appl. No.: 11/612,711

(22) Filed: Dec. 19, 2006

(65) Prior Publication Data

US 2008/0143718 A1 Jun. 19, 2008

(51) Int. Cl.
*G06K 9/00* (2006.01)

(52) U.S. Cl. .................. 382/128; 382/131; 382/132; 382/154

(58) Field of Classification Search .................. 382/128, 382/131, 132, 154
See application file for complete search history.

(56) References Cited

U.S. PATENT DOCUMENTS

| | | | |
|---|---|---|---|
| 5,187,660 A | 2/1993 | Civanlar et al. | |
| 5,638,458 A | 6/1997 | Giger et al. | |
| 6,246,784 B1 | 6/2001 | Summers et al. | |
| 6,731,782 B2 | 5/2004 | Ashton | |
| 6,901,277 B2 | 5/2005 | Kaufman et al. | |
| 7,103,224 B2 | 9/2006 | Ashton | |
| 7,130,457 B2 | 10/2006 | Kaufman et al. | |
| 7,158,692 B2 | 1/2007 | Chalana et al. | |
| 7,536,216 B2 | 5/2009 | Geiger et al. | |
| 2006/0177125 A1* | 8/2006 | Chan et al. | 382/154 |
| 2006/0274928 A1* | 12/2006 | Collins et al. | 382/132 |

FOREIGN PATENT DOCUMENTS

| | | |
|---|---|---|
| WO | WO 2004/081874 | 9/2004 |
| WO | WO 2006/000953 | 1/2006 |

OTHER PUBLICATIONS

Lixu Gu et al., "3D Segmentation of Medical Images Using a Fast Multistage Hybrid Algorithm," International Journal of Computer Assisted Radiology and Surgery: A Journal for Interdisciplinary Research, Development and Applications of Image Guided Diagnosis and Therapy, vol. 1, No. 1, Mar. 1, 2006, pp. 23-31, XP019360745.
O. Colliot et al., "Segmentation of Focal Cortical Dysplasia Lesions on MRI Using Level Set Evolution," Neuroimage, Academic Press, vol. 32, No. 4, Oct. 1, 2006, pp. 1621-1630, XP005644162.

(Continued)

*Primary Examiner*—John B Strege

(57) ABSTRACT

A method of segmenting a lesion (910) from normal anatomy in a 3-dimensional image comprising the steps of: receiving an initial set of voxels (520) that are contained within the lesion to be segmented; growing a region which includes the lesion from the initial set of voxels; identifying a second set of voxels (530) on a surface of the normal anatomy; determining a surface containing the second set of voxels which demarks a boundary (540) between the lesion and the normal anatomy; and classifying voxels which are part of the lesion.

19 Claims, 15 Drawing Sheets

OTHER PUBLICATIONS

Nikhil S. Rajguru et al., "Enhanced Level-set Approach to Segmentation of 3-D Heterogeneous Lesions from Dynamic Contrast-Enhanced MR Images," Image Analysis and Interpretation, 2006 IEEE Southwest Symposium, Mar. 26-28, 2006, pp. 71-75, XP010917528.

Shen et al.; A New Algorithm for Local Surface Smoothing with Application to Chest Wall Nodule Segmentation in Lung CT Data; Medical Imaging 2004, Proceedings of SPIE vol. 5370, pp. 1519-1526.

J.A. Sethian; Leval Set Methods and Fast Marching Methods; University of California, Berkeley, Cambridge University Press, 1999.

Carr et al.; Surface interpolation with radial basis functions for medical imaging; IEEE Transactions on Medical Imaging, vol. XX, No. Y, Feb. 1997, pp. 1-18.

Beatson et al.; Fast Solution of the Radial Basis Function Interpolation Equations: Domain Decomposition Methods; 2000 Society for Industrial and Applied Mathematics, pp. 1717-1740.

Lorensen et al.; Marching Cubes: A High Resolution 3D Surface Construction Algorithm; Computer Graphics, vol. 21, No. 3, 1987, pp. 163-169.

Schall et al.; Surface from Scattered Points: A Brief Survey of Recent Developments; 1st International Workshop towards Semantic Virtual Environments, 2005, pp. 138-147.

Wang et al.; Filling holes on locally smooth surfaces reconstructed from point clouds; Image and Vision Computing 25 (2007), pp. 103-113.

Chopp et al.; Computing Minimal Surfaces via Levei Set Curvature Flow; Journal of Computational Physics, vol. 91, 1994, pp. 77-91.

Schlathölter et al., "Simultaneous Segmentation and Tree Reconstruction of the Airways for Virtual Bronchoscopy," Proceedings of the SPIE, vol. 4684, Feb. 24, 2002, pp. 103-113, XP002385959.

Sebbe et al. "Model-Guided Segmentation of Opacified Thorax Vessel," Image Processings 2005, IEEE International Conference on Genova, Italy Sep. 11-14, 2005, pp. 25-28, XP010850677.

Bülow et al., "A General Framework for Tree Segmentation and Reconstruction from Medical Volume Data," Lecture Notes in Computer Science, vol. 3216, Sep. 26, 2004, pp. 533-540, XP002385960.

Pitas et al., "Memory Efficient Propagation-Based Watershed and Influence Zone Algorithms for Large Images," IEEE Transactions on Image Processing, vol. 9, No. 7, Jul. 2000, XP011025623.

Sethian, J.A., Level Set Methods and Fast Marching Methods, Cambridge University Press, 1999.

Kostis et al, Three-Dimensional Segmentation and Growth-Rate Estimation of Small Pulmonary Nodules in Helical CT Images, IEEE Transactions on Medical Imaging, vol. 22, No. 10, Oct. 2003, pp. 1259-1274.

Perchet et al, Advanced navigation tools for virtual bronchosopy, Image Processing: Algorithms and Systems III Proceedings of the SPIE, vol. 5298, 2004, pp. 147-158.

* cited by examiner

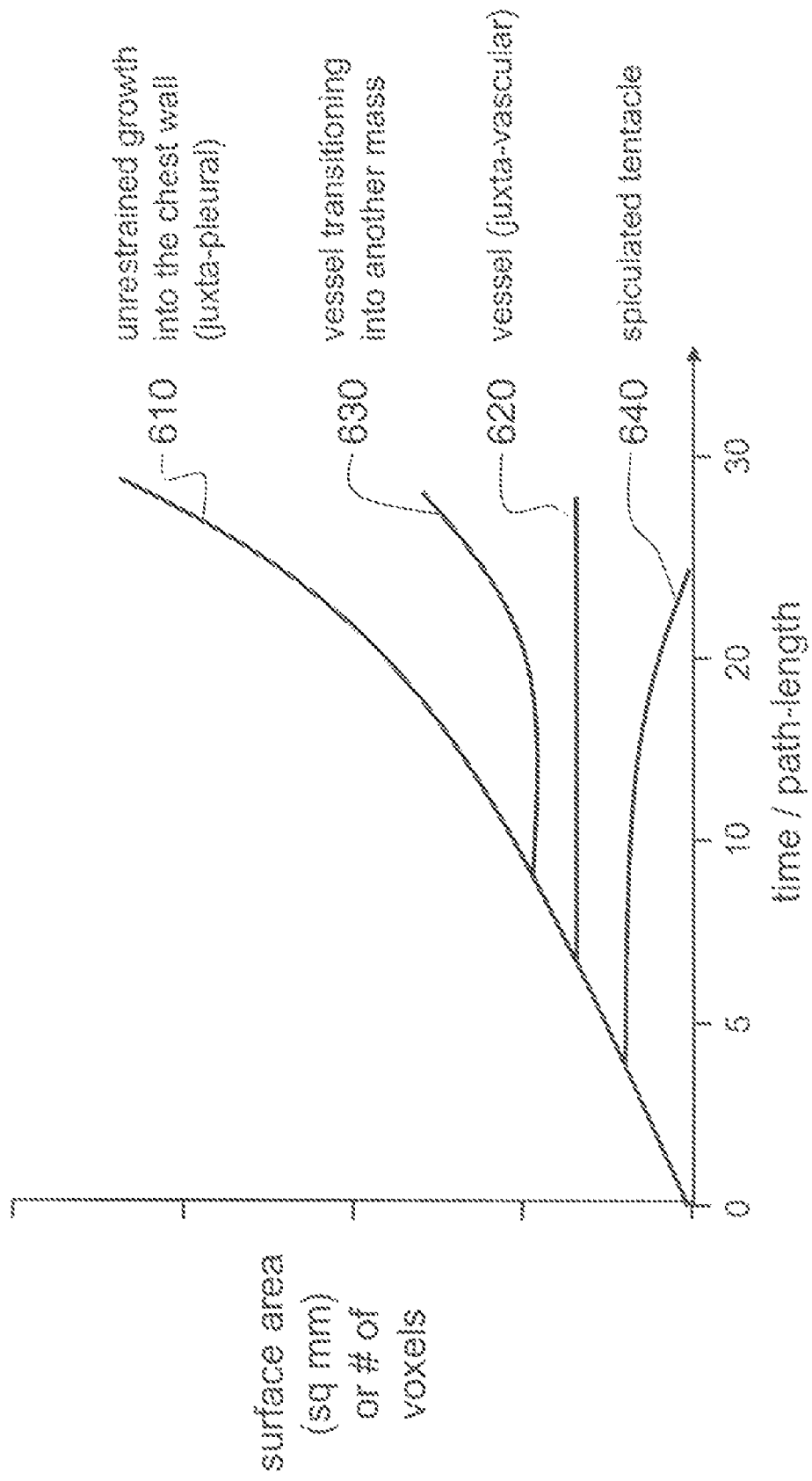

METHOD FOR SEGMENTATION OF LESIONS

CROSS REFERENCE TO RELATED APPLICATIONS

Reference is made to commonly-assigned copending U.S. patent application Ser. No. 11/567,857, filed Dec. 7, 2006 entitled ANALYZING LESIONS IN A MEDICAL DIGITAL IMAGE, by Simon et al., the disclosure of which is incorporated herein.

FIELD OF THE INVENTION

The present invention relates to the field of digital imaging, and more particularly to processing a digital image to segment an object in a 3-dimensional data set.

BACKGROUND OF THE INVENTION

Identification of potentially cancerous lesions in CT and MRI studies is a common task of radiologists. An important aspect of this task is determining the extent and the volume such a lesion occupies. This is a tedious task to accomplish manually, due to the irregular shape of suspected lesions and the ever-increasing number of slices captured by diagnostic imaging systems.

A method of automating the process is to have a computer perform such a task once the lesion has been identified. This task is commonly referred to in the image-processing domain as image or volume segmentation and techniques referred to as region growing are typically applied. Region growing algorithms typically use local image characteristics, such as image intensity variations to decide whether a neighboring voxel (3D volume images) or pixel (2D planar images) is to be added to the growing region. However, segmenting lesions from normal anatomy is a difficult task, (see Hong Shen, et. al., "A New Algorithm for Local Surface Smoothing with Application to Chest Wall Nodule Segmentation in Lung CT Data," Medical Imaging 2004, Proceedings of SPIE Vol. 5370) as the image differences the lesion and normal anatomy often are not discernable in terms of voxel intensity values, e.g., Hounsfield units HU. As a consequence, region-growing tasks often expand beyond the target and, in the case of segmenting lesions, include regions that are most likely to be healthy tissue or normal anatomy.

The subsequent phase is to ascertain a surface that separates the lesion from normal anatomy within the initial segmented region. Common approaches to the problem are to fit a plane or low degree polynomial surface, or a sequence of dividing lines on a slice-by-slice basis, to demark the boundary between normal anatomy and the suspected lesion. Unfortunately, these methods are too restrictive and often fail to produce desirable results. A primary reason is that such approaches are overly simplistic and do not account for the local geometry, or the variability of surfaces within a volume. The selection of a surface model imposes an implicit assumption on the kind of local surface one expects.

The present invention approaches this problem by using methods that overcome these limitations. The invention is an ensemble of methods, where each is increasingly sophisticated, but requires more computational resources. All of these methods use the boundary of the leading edge of an expanding segmentation front that is likely to be part of the normal anatomy and finds a surface that holds this boundary fixed.

SUMMARY OF THE INVENTION

It is an object of the present invention to ascertain a surface that separates the lesion from normal anatomy within the initial segmented region, such as a pulmonary lesion, from the background tissue in a volumetric medical image. More particularly, the object is to refine segmentation in cases using knowledge of normal anatomy.

Briefly, according to one aspect of the present invention a method of segmenting a lesion from normal anatomy in a 3-dimensional image comprising the steps of: receiving an initial set of voxels that are contained within the lesion to be segmented; growing a region which includes the lesion from the initial set of voxels; identifying a second set of voxels on a surface of the normal anatomy; determining a surface containing the second set of voxels which demarks a boundary between the lesion and the normal anatomy; and classifying voxels which are part of the lesion.

The present invention has an advantage of determining a boundary between a lesion and tissue initially identified as a lesion by an image segmentation algorithm. In particular, the present invention separates normal anatomy from structures of pulmonary lesions. The separation is done in accordance with local anatomical geometry and does not impose a low level ad hoc parametric model for the task.

BRIEF DESCRIPTION OF THE DRAWINGS

FIG. 6 shows a graph of the number of voxels as a function of path length for different idealized lesion types.

DETAILED DESCRIPTION OF THE INVENTION

Figure 1:
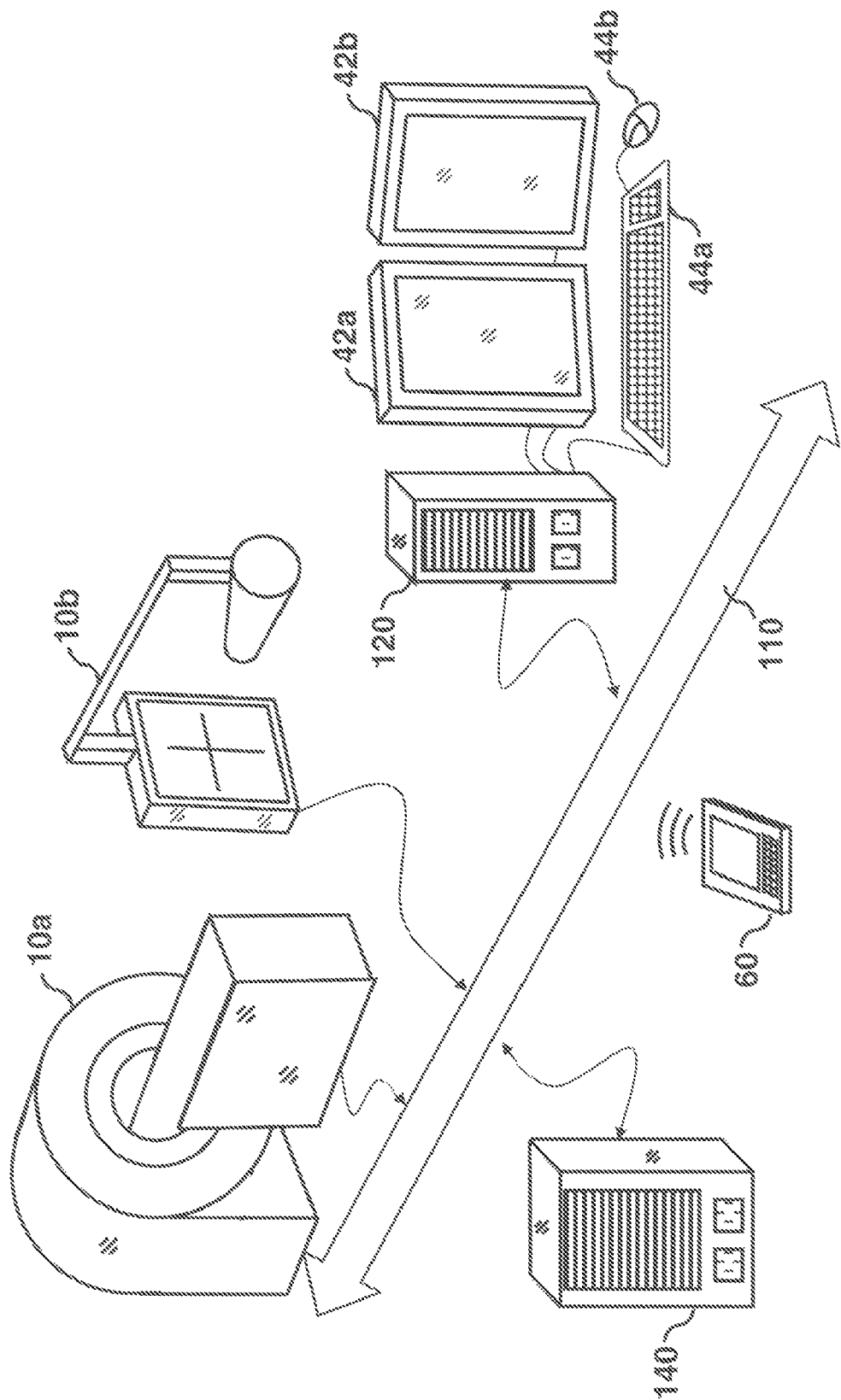
FIG. 1 is a diagram showing a medical imaging communications network of connected computers suitable for practicing the present invention.

Many medical imaging applications are implemented via a picture archiving and communications systems (PACS). These systems provide a means for displaying digital images acquired by a wide variety of medical imaging modalities such as, but not limited to, projection radiography (x-ray images), computed tomography (CT images), ultrasound (US images), and magnetic resonance (MR images). Each of the above mentioned medical imaging modalities contain a slightly different set of diagnostic information. In particular, CT and MR images are obtained with imaging x-ray emission and when viewed and studied by radiologist, can reveal much detail about a patient's 3-dimensional internal anatomy. Computer algorithm technology can also be applied to medical images to enhance the rendering of the diagnostic information, to detect an abnormal condition, i.e. computer aided detection (CAD), and to make measurements relating to the patient's condition, i.e. computer aided measurement (CAM).

The present invention represents an algorithmic computer method for segmenting a portion of a medical image with anatomical relevance. In particular, the primary motivation for the development of the technology described herein is the segmentation of abnormal pulmonary lesion tissue from normal pulmonary tissue. An intended use for the herein described technology is as follows. A radiologist reviews a thoracic CT exam on a medical PACS and indicates to the CAM segmentation software the position of a suspected pulmonary lesion. The voxel position indicated represents a seed point assumed to be part of the pulmonary lesion. The CAM segmentation software then identifies the voxels surrounding and contiguous with the seed point that are also associated with the pulmonary lesion. Once the region associated with the pulmonary lesion has been segmented a corresponding volumetric size can be calculated. The technology advancement of the present invention relates to the particular method of performing the image segmentation task. For the purpose of the description herein, the terms lesion and nodule are synonymous and should be considered interchangeable.

In the following description, a preferred embodiment of the present invention will be described as a software program. Those skilled in the art will readily recognize that the equivalent of such software may also be constructed in hardware. Since image processing and manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

A system suitable for practicing the present invention is illustrated in FIG. 1 showing a medical imaging communications network that includes multiple connected computers. Such a network of computers provides a means of sending and receiving information between any two or more connected computers. The image capture device 10a symbolically represents a number of medical digital image modality devices such as, but not limited to, a computed tomography scanning device (CT) or magnetic resonance imaging scanning device (MR) that is capable of producing 3-dimensional digital images of patient anatomy. The 3-dimensional digital images are typically composed of a series of cross-sectional, or slice, images through the patient anatomy.

Also connected to the communications network 110 is a digital radiographic (DR) capture device 10b capable of producing digital x-ray images. As such, the images produced by a DR capture device typically are one or more 2-dimensional digital images each representing a different exposure and or imaging path through the patient. For example, the DR capture device 10b can be used to acquire multiple projection radiographic digital images with its x-ray source located in different positions relative to the patient. The resulting DR radiographic digital images can be processed to produce a set of slice digital images that represent a 3-dimensional digital image of the patient.

The slice digital images (not shown) produced by the capture device 10a are transmitted via the communications network 110 to a image archive computer 140 where, along with patient history information, they become part of an electronic patient history record. The main function performed by the image archive computer 140 is the facilitation of transfer or exchange of image information rather than the processing of information. The image archive computer 140 serves as a large storage repository of digital images and other medical information. The arrows in the diagram of FIG. 1 represent the exchange of information, which in general, is bidirectional, i.e. the flow of information can be in either direction.

The slice images are later queried on a diagnostic workstation computer 120, sometimes referred to as a picture archive and communication system (PACS), for viewing and examination by a radiologist or similarly trained medical professional. The diagnostic workstation computer 120 can have multiple electronic displays connected for viewing medical images. Two such electronic display devices 42a and 42b are shown in FIG. 1. Also connected to the diagnostic workstation computer 120 are input devices 44a and 44b depicted here as keyboard and mouse devices respectively. Although the technology of the present invention was envisioned as operating within the context of a diagnostic workstation computer, it should be noted that any computing device capable of displaying and processing image data could be used. In particular, a mobile computer 60 shown in FIG. 1 can be used with the present invention. Thus, it is not necessary for the computer to be physically connected to the communications network 110.

A PACS can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but is not limited to, non-image information (meta-data) such as age, sex, medical history, prescribed medications, symptoms, etc.

For the purposes of the discussion of the present invention the collection of inter-connected computers including the communications network will be also be referred to as a DICOM network since DICOM formatted digital images are currently the most prevalent file encoding used for medical digital images. Typically a 3-dimensional volume image is constructed from set of 2-dimensional slice digital images wherein each slice digital image is encoded as an individual DICOM file.

Often an individual image data element, i.e. single value representing signal intensity at a point or small region, is referred to as a voxel for 3-dimensional images and a pixel for 2-dimensional images. The term voxel is commonly used to characterize a volume-element whereas the term pixel is commonly used to characterize a picture-element. The technology embodied within the present invention can be applied to 2-dimensional and 3-dimensional images. As such, for the purposes of the description herein, the terms voxel and pixel should be considered interchangeable, i.e. describing an image elemental datum capable of having a range of numerical values. Voxel and pixels can be said to have the attributes both of location and value.

With the medical imaging system setup as described above and shown in FIG. 1, a medical professional such as a radiologist (not shown), uses the keyboard 44a or mouse 44b to indicate to the software application program 150 (shown in FIG. 2), running on the diagnostic workstation computer 120, the desired patient record (not shown) to be loaded into memory. The CT digital image exam, i.e. the set of CT slice digital images, is then retrieved from the image archive computer 140 and displayed on the electronic display devices 42a and/or 42b. After viewing the image data, the medical professional indicates to the system the location of a suspected pulmonary lesion with a click of the mouse, input device 44b. Typically this is performed by sequentially scrolling through the 2-dimensional slice images and viewing the slice digital image that best shows the suspected pulmonary lesion.

Figure 2:
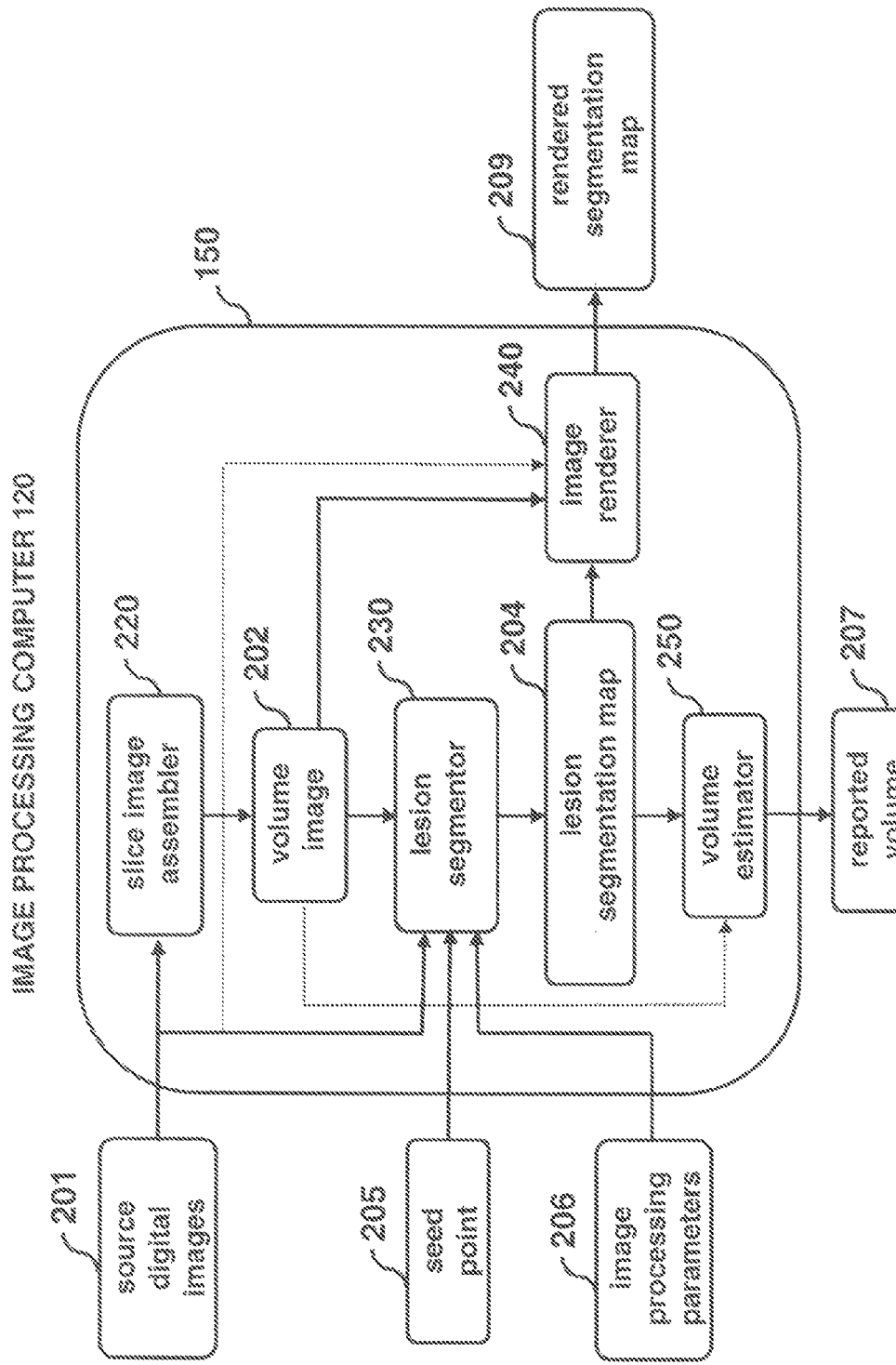
FIG. 2 is block diagram showing the details of the software program running within the diagnostic workstation computer.

A brief overview of the flow of image information into, out of, and within segmentation application program, referred to as the "segmenter" 150 is depicted by FIG. 2. The segmenter 150 receives a set of source digital images 201, a seed point 205, and image processing parameters 206 and produces a reported volume 207, a segmentation map 204, and alternatively, a rendered segmentation map 209, using image renderer 240. Within the segmenter 150, the following analysis and processing is performed. The slice image assembler 220 receives the multiple images as the set of source digital images 201 and generates a volume image 202. The volume image 202, the image processing parameters 206, and the seed point 205 are then passed to the lesion segmenter 230, image renderer 240, and volume estimator 250. The volume image 202 provides imaging voxel data regarding the 3-dimensional nature of the patient anatomy. The image processing parameters 206 contain multiple data items that regulate, or control, the actions of the lesion segmenter 230. The seed point 205 communicates location of a suspected pulmonary lesion. The lesion segmenter 230 generates a segmentation map 204, i.e. volume image data that indicates, on a voxel by voxel basis, the segmentation classification information as to whether or not each voxel is considered part of the segmented lesion or another anatomical structure.

Figure 3:
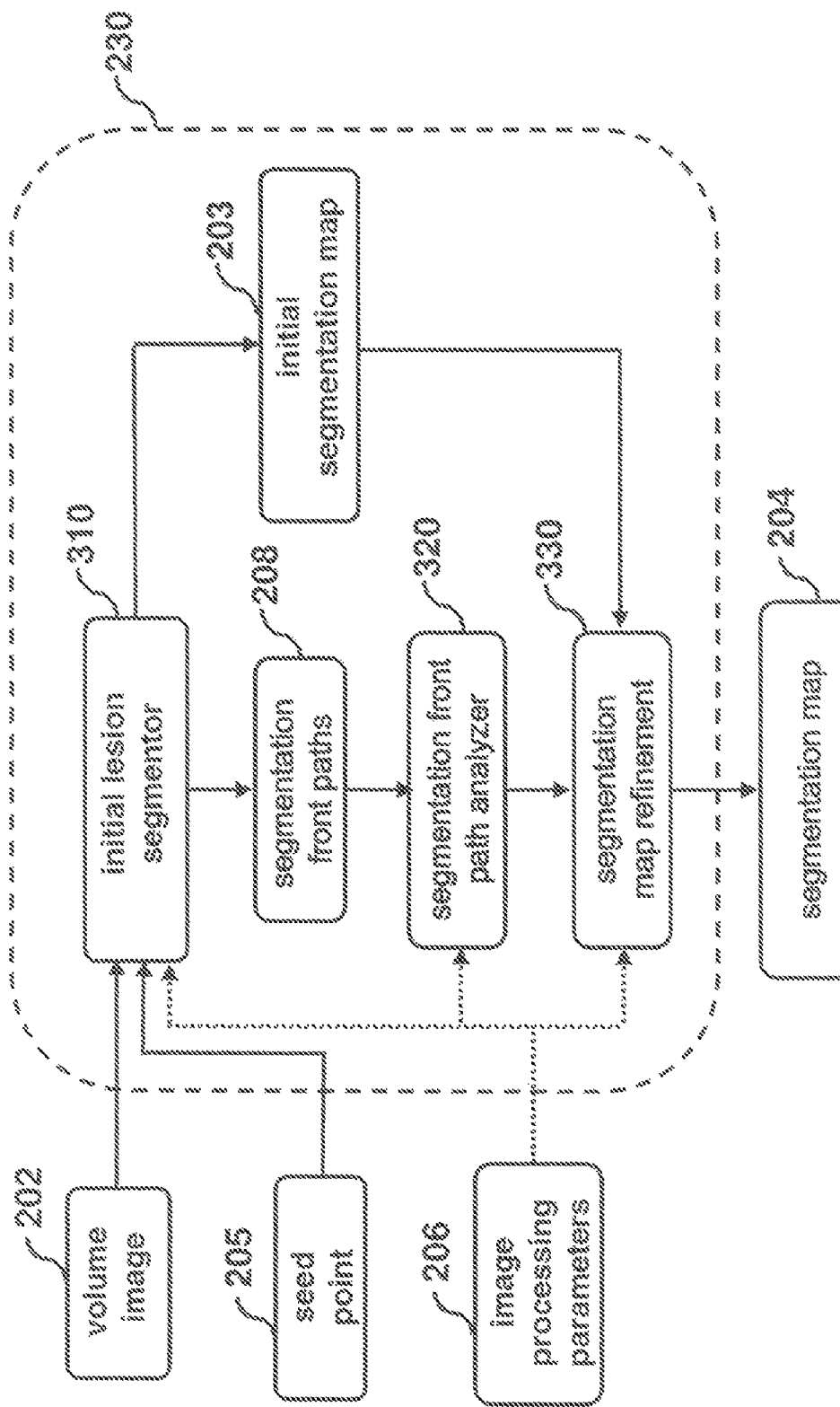
FIG. 3 is block diagram showing the details of the lesion segmenter.

The details of the lesion segmentor 230 shown in FIG. 2 are depicted in more detail in FIG. 3. The lesion segmentor 230 produces, on output, a final segmentation map 204 that represents the voxels identified as part of the pulmonary lesion, spiculated tentacle's of the lesion, vessels, normal anatomy (lung wall, mediastinum, etc), background (lung parenchyma). The initial lesion segmentor 310 receives the volume image 202, seed point 205 and image processing parameters 206 as input and produces segmentation front paths 208 and the initial segmentation map 203. The image processing parameters 206 are a set of control parameters used to regulate the overall segmentation processing. The seed point 205 indicates an x, y, z location (typically as a set of i, j, k indices) of a suspected pulmonary lesion within the volume image 202. It is about this voxel location that the initial lesion segmentor 310 performs a first segmentation process. Optionally, the location of the seed point can be automatically adjusted to ensure the segmentation result is independent of the seed point location; as long as the seed point is inside the lesion. The initial segmentation map 203 represents a first-attempt classification of voxels, by the initial lesion segmentor 310, for voxels classified as part of the pulmonary lesion. A segmentation front path is a collection of voxels that represent a connected region-growing sequential path that is generated as part of the region growing processing. The ensemble of segmentation front paths 208 is a catalog of all the individual segmentation front paths. The segmentation front path analyzer 320 receives the segmentation front paths 208 and classifies each individual segmentation front path as associated with a particular anatomical structure. The segmentation map refiner 330 using both the segmentation front paths 208 and the initial segmentation map 203 and performs further refinement of the segmentation processing. The segmentation front path analyzer 320 classifies those voxels associated with non-lesion anatomy structures. The final segmentation map 204 incorporates these refinements. The final segmentation map 204 identifies voxels deemed to be part of the lesion tissue and voxels that are part of non-lesion anatomy. The embodiment of lesion segmentor 230 as describe within is referred to as a segmentation front analysis.

Figure 4:
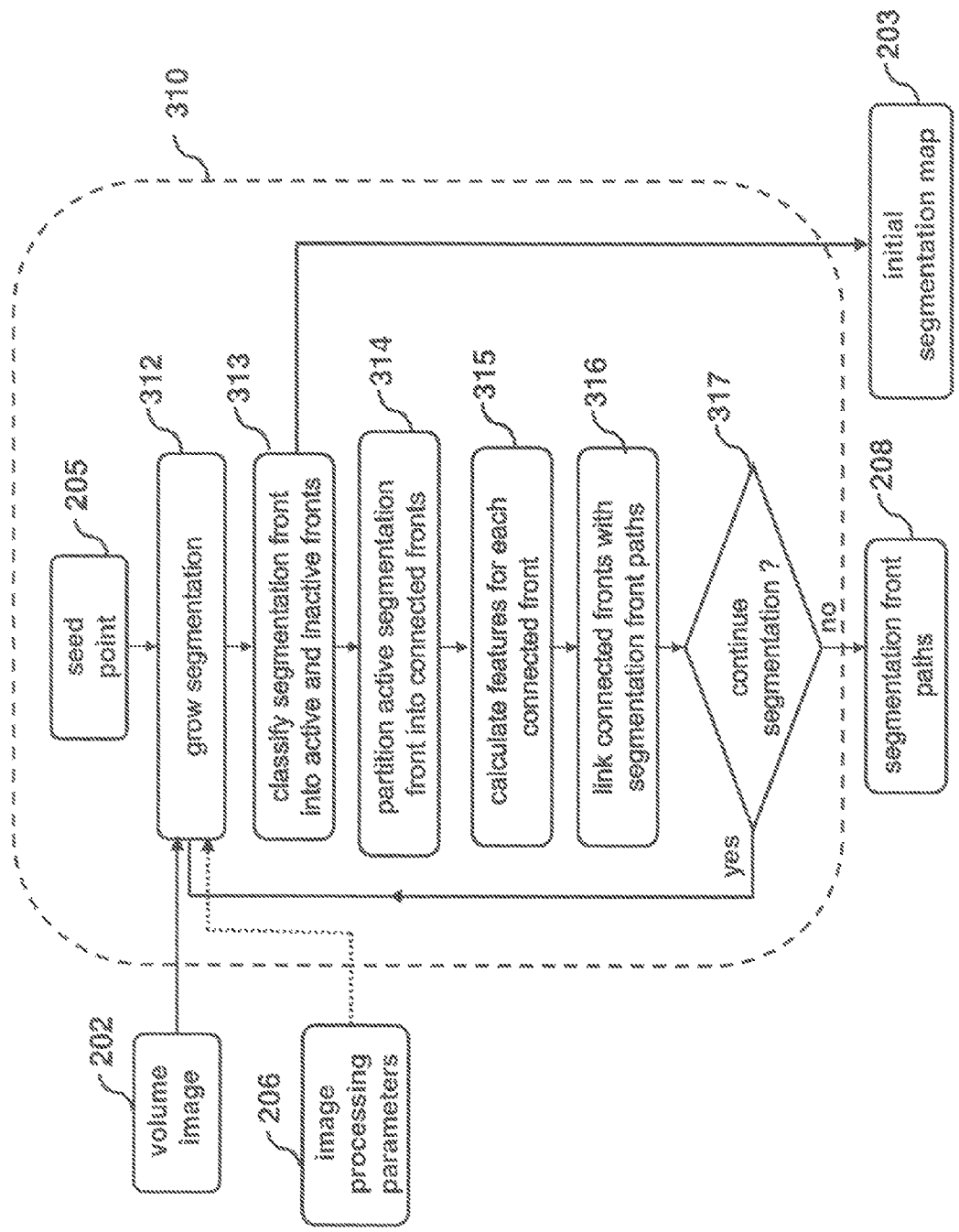
FIG. 4 is block diagram showing the details of the initial lesion segmenter.
Figure 5A:
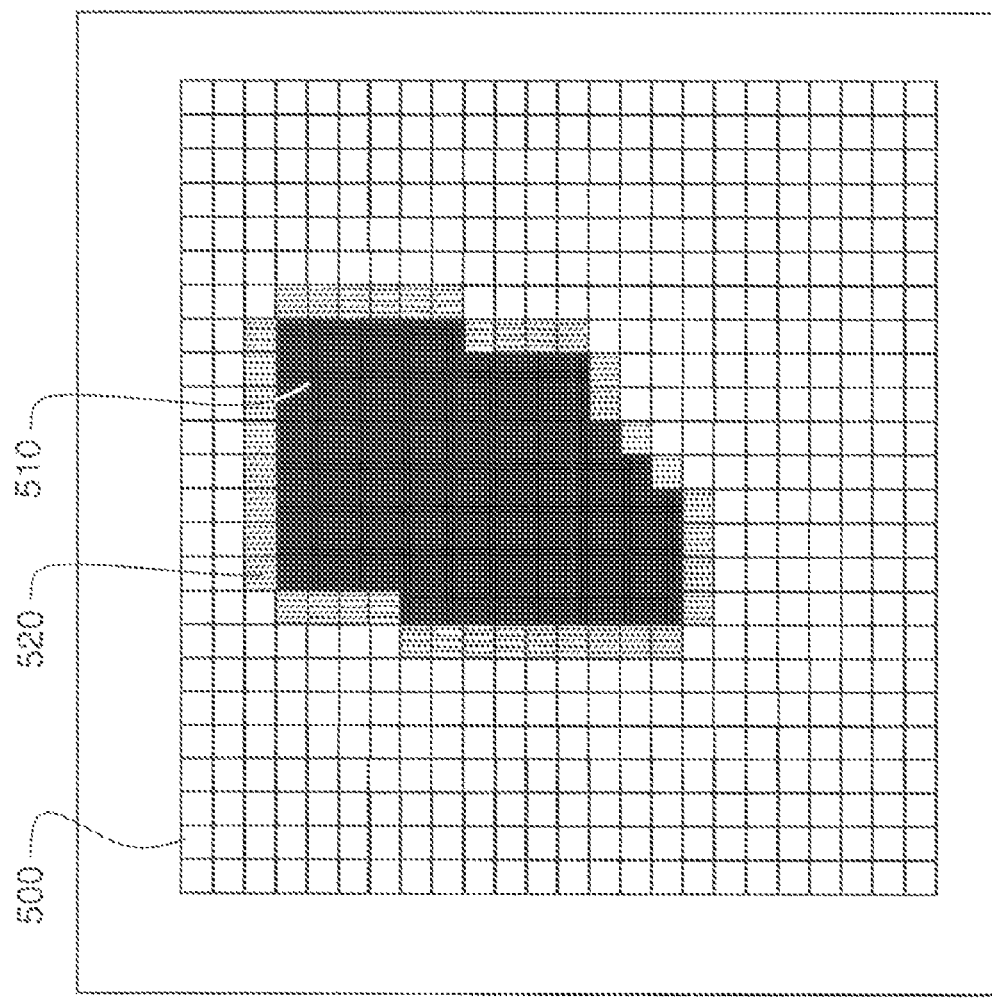
FIGS. 5a, 5b, and 5c is a schematic representation of the segmentation process within the initial lesion segmentor.
Figure 5B:
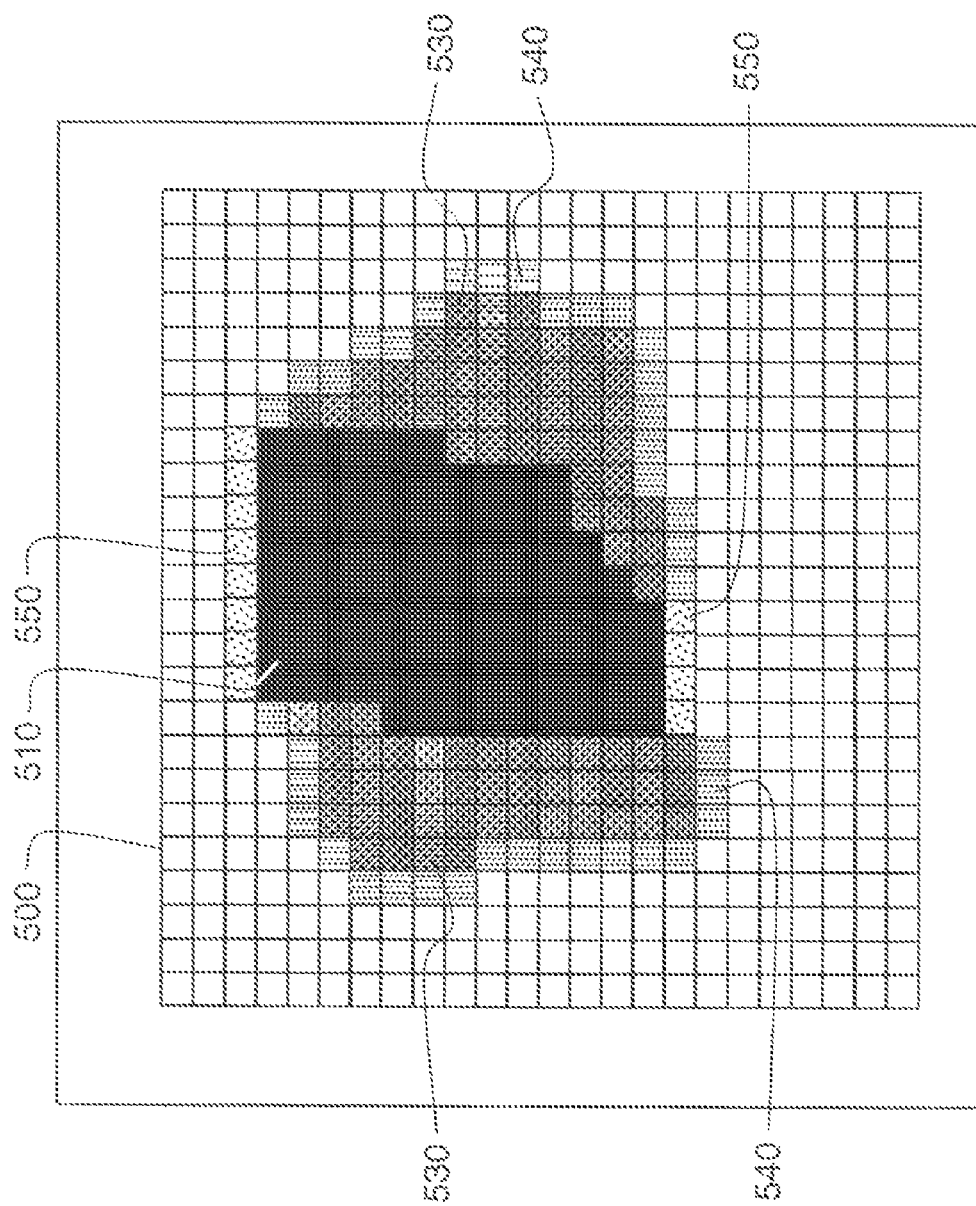
Figure 5C:
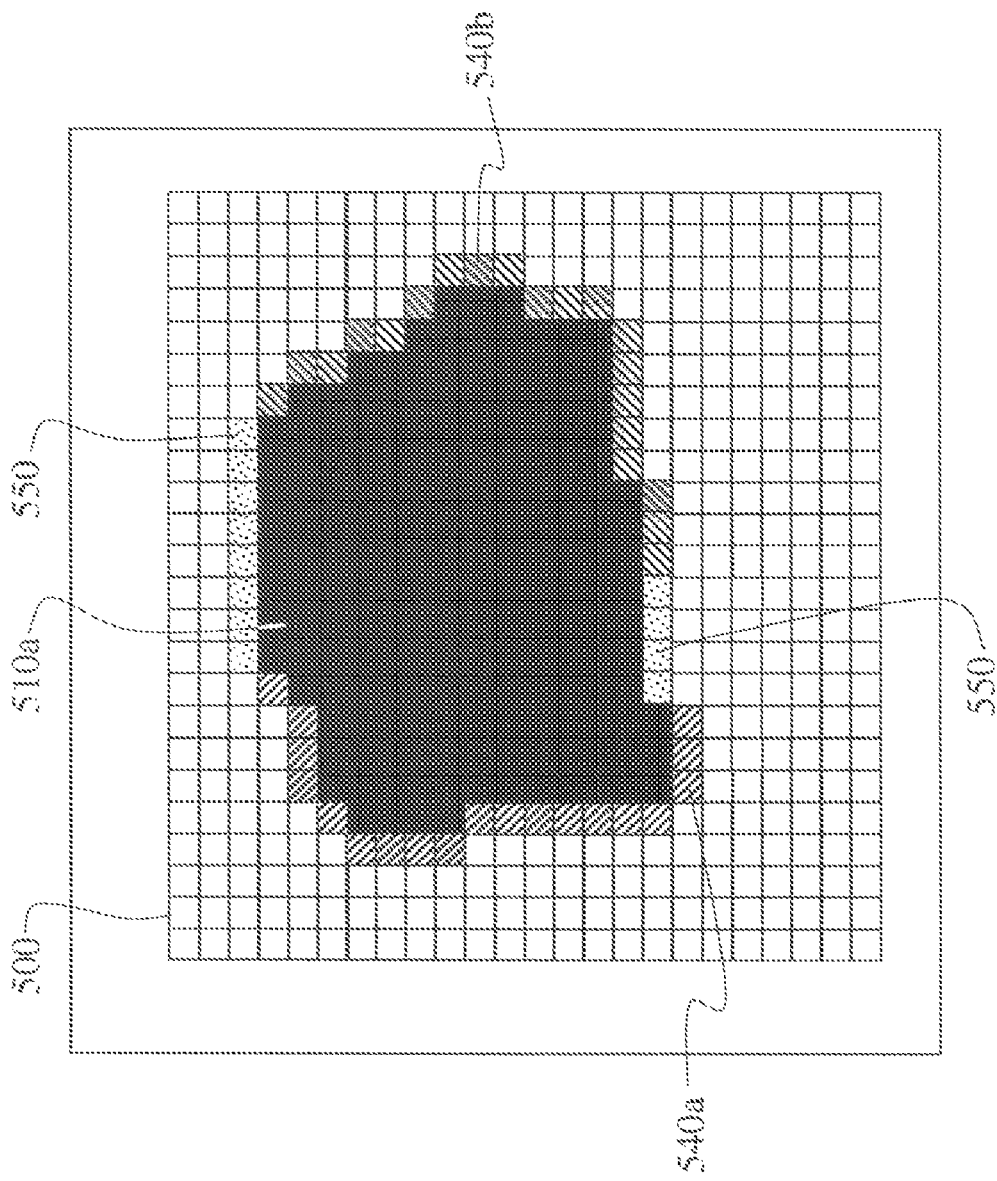

The details of a preferable initial lesion segmenter 310 shown in FIG. 3 are depicted in more detail in FIG. 4 and schematically in FIGS. 5a, 5b, and 5c. Without loss of generality, the schematic representation of the lesion segmentor in FIGS. 5a, 5b, and 5c represent a two-dimensional embodiment where the grid 500 has been uniformly sampled and connectivity of four grid elements (pixels) have been assumed. One skilled in the art will realize that the above representation can be extended to three or more dimensions with different degrees of connectivity between grid elements (voxels). Upon initiation the initial lesion segmentor 310 receives the volume image 202, seed point 205, and image processing parameters 206 as input. The set of voxels 520 on the boundary of the current segmentation map 510 are denoted as the current segmentation front from which further growth of the segmentation can occur. Initially the set of voxels in the segmentation is the seed point 205 and is considered the first segmentation front. In the grow segmentation step 312, the segmentation region grows by adding a set of voxels 530, according to a predefined set of rules, starting from the set of voxels 520 on the boundary of the current segmentation map 510. The number of voxels added to the segmentation during the grow segmentation step 312 is controlled by D1; a parameter in the image processing parameters 206. In a preferred implementation of the initial lesion segmentor 310, during the grow segmentation step 312 at a minimum every voxel on the boundary of the current segmentation 510 is used to grow the segmentation region. The set of voxels 530 is added to the current segmentation map 510 producing segmentation map 510a that subsequentially becomes the current segmentation map.

In the classify segmentation front into active and inactive fronts step 313, the current segmentation front is delineated and is classified into active 540 and inactive 550 segmentation fronts. Inactive segmentation fronts contain voxels in which no further growth of the segmentation can occur according to the segmentation criteria. Segmentation fronts that contain voxels that can initiate further growth are considered active fronts. In the partition active segmentation front into connected fronts step 314, the active segmentation front is partitioned into a set of uniquely labeled connected fronts 540a and 540b where all the voxels of a uniquely labeled front are connected.

In the calculate features for each connect front step 315, features for each segmentation front are computed. Features for each segmentation front k and the volume associated with each segmentation front can be computed, such as, the number of voxels $N_k$, the center of gravity (centroid) $C_k$, shape and orientation, direction between successive segmentation fronts, curvature, etc. The centroid of a wave-front part is defined as $$C_k = \frac{1}{N_k} \sum_i X_i$$

where $X_i$ is the coordinate of the ith voxel in segmentation front k. The direction between successive segmentation front is defined as $$D_k = C_{k+1} - C_k$$

and the curvature is defined as $$\kappa_k = |D_k - D_{k-1}|.$$

The shape and orientation of the kth segmentation front can be determined by the eigenvalues $\lambda$ and eigenvectors u of the covariance matrix of the voxel's spatial coordinates X that makeup the kth segmentation front. The eigenvalues yield the orientation or principal axes of the front and eigenvectors yield information related to the shape of the front. For example, if eigenvalues are ordered in magnitude such that $\lambda_1 \leq \lambda_2 \leq \lambda_3$, then a front associated with a vessel is indicated by $\lambda_1$ being small (ideally zero), and $\lambda_2$ and $\lambda_3$ are of larger and similar magnitude. The respective eigenvectors $u_1$ indicates the direction along the vessel and $u_2$ and $u_3$ form the normal (orthogonal) plane.

In the link connected fronts with segmentation front paths step 316, each labeled connected front is linked into a parent-child relationship with a previous labeled segmentation front generating a segmentation front path. A segmentation front path is the list of distinct segmentation fronts traversed, starting from the seed point 205, in which successive segmentation fronts are linked together by a parent child relationship. Hence a data-structure in the form of a tree is created where each segmentation front path represents a unique path through the tree structure.

In the continue segmentation step 317, a decision is made whether to continue looping through the segmentation process. One way the processing can finish is if there are no active segmentation fronts available for further segmentation growth. Another way the processing can terminate is if the segmentation front paths indicate that the only current segmentation growth is occurring within normal anatomy, see below. The loop processing within the initial lesion segmentor 310 can also be stopped if a condition specified by parameter value D2 contained in the image processing parameters 206 is meet. For example, the total number of voxels contained in the segmentation map has exceeded a given threshold. When the loop processing has finished, the current segmentation map becomes the initial segmentation map 203. At this stage, voxels within the initial segmentation map 203 are classified either as being lesion or background.

A preferred embodiment of the initial lesion segmentor 310 employs a version of the Fast-Marching method described by J. A. Sethian in the publication "Level Set Methods and Fast Marching Methods", Cambridge University Press, 1999. The fast marching approach models the segmentation process as a propagating wave front, a surface in 3D or a curve in 2D, which over time is moved by image and non-image driven forces to the boundaries of the desired objects. The wave front corresponds to the segmentation front defined previously. The propagating wave front may be described by the eikonal Equation, $$\left(\frac{\partial t}{\partial x}\right)^2 + \left(\frac{\partial t}{\partial y}\right)^2 + \left(\frac{\partial t}{\partial z}\right)^2 = \frac{1}{s^2(x, y, z)} = c(x, y, z) \quad (1)$$

where t is the time at which the front crosses point (x, y, z), s is the speed function, and c is the cost function.

The fast marching method solves Equation (1) by directly mimicking the advancing wave front. Every point on the computational grid is classified into three groups: points behind the wave front who have already been segmented, whose travel times are known and fixed; points on the wave front, whose travel times have been calculated, but are not yet been segmented; and points ahead of the wave front. The algorithm then proceeds as follows:

1) Choose the point on the wave front with the smallest travel time.
2) Fix this travel time.
3) Advance the wave front, so that this point is behind it, and adjacent points are either on the wave front or behind it.
4) Update the travel times for adjacent points on the wave front by solving Equation (1) numerically.
5) Repeat until every point is behind the wave front or until a stopping condition has been meet.

Many different cost-function can be used in the context of a fast-marching approach. For example, the cost-function can be based on the magnitude of the gradient of voxel values. Another cost-function can be based on the curvature of surface normal vectors. Additionally, any combination of cost-functions can serve as cost-function. A preferred embodiment used a binary cost-function that returns 1 for voxels whose value is above a given threshold and infinity for voxels whose value is below or equal to the threshold. By choosing a cost function that returns infinity for a voxel value below the threshold results in the inactivation (or freezing) of the segmentation front at that voxel. This type of cost function yields a geodesic distance map that associates each voxel within the segmentation with its geodesic distance from the seed point 205. A threshold value of approximately −350 HU works well for segmenting solid-type pulmonary lesions. The cost-function threshold value, included in the image processing parameters 206, can be a parameter that is application specific or even preferentially set by an individual radiologist. Alternatively, the threshold can be determined automatically by an algorithmic method. For example, the threshold can be determined either by analyzing traces of the voxels values that originate at the seed point and extend in different directions through the nodule to the background (lung parenchyma) or by histogram analysis of voxel values in a bounding volume about the seed point that is large enough to include the both nodule and background. In a preferred implementation of the fast marching approach, parameter values D1 and D2 contained in the image processing parameters 206 respectively represent an increment in the geodesic distance traveled from the current segmentation front to a voxel and the geodesic distance from the seed point 205 to an active segmentation front. In the preferred implementation the incremental geodesic distance between segmentation fronts controlled by D1 is set equal to one and the total geodesic distance traveled before stopping initial lesion segmentor 310 controlled by D2 is set equal to 40 mm.

One skilled in the art will recognize that there are many different algorithms that can be used to calculate a geodesic distance map or a cost weight variant of geodesic distance map that can be utilize in the current invention.

The initial lesion segmentor 310 often expands beyond the target and in the case of segmenting lesions, can include regions that correspond to normal anatomy. There are many types of pulmonary lesions that can be distinguished by the analysis of the segmentation front paths 208. The segmentation front paths 208 can be use to ascertain regions that correspond to normal anatomy and to generate surfaces that separate the lesion from normal anatomy within the initial segmented region. Referring to FIG. 3, the segmentation front paths 208 generated by the initial lesion segmentor 310 are analyzed for structural characteristics by the segmentation front path analyzer 320. The features computed in step 315 are used to analyze the segmentation front paths or sections of a segmentation front path. For many cases, a plot of the number of voxels in a segmentation front plotted for successive segmentation fronts reveals much about the underlying anatomical structure. For isotropically sampled voxel data, the number of voxel relates directly to the surface area of a segmentation front. For anistropically sampled voxel data, the number of voxels in the segmentation front can be used as a surrogate for the surface area.

Idealized plots for a sessile juxta-pleural lesion 610, a juxta-vascular lesion 620, a juxta-vascular lesion attached via a vessel to another anatomical structure 630, and a lesion containing a spiculated tentacle 640 are shown in FIG. 6. In the sessile juxta-pleural lesion 610, when the advancing segmentation front path penetrates into the lung wall or mediastinum, the progression of surface area values starts to increase substantially (approximately squared distance relationship) as a function of path-length (geodesic distance from the seed point 205 to a given segmentation front). An unrestrained segmentation front surface will have a corresponding surface area progression that varies approximately as the distance squared. This situation can happen if a seed point is located within a solid mass.

Another anatomical structure that can be differentiated by analyzing the properties of the segmentation front is a spiculated tentacle 640. As shown in the graph depicted in FIG. 6, the surface area, or number of voxels, of the progression diminishes with path-length until, eventually, the progression terminates. Most spiculated tentacles vanish in just a short path length. Conversely, vessels (juxta-vascular 620) tend to have corresponding progressions of surface area that are relatively constant as a function of path-length. Additionally, larger vessels have correspondingly greater number of voxels and larger surface area values. The surface area of the segmentation fronts that correspond to vessels essentially represents the cross-sectional area of the vessel since the segmentation front surface progression tends to follow the axis of vessels. By observation, most spiculated tentacles have smaller corresponding surface area values associated with their respective segmentation fronts.

Lesions, especially cancerous lesions, can grow along vessels and form spiculated tentacles that connect to another anatomical structure. When a lesion is connected to another structure, e.g. another lesion, the chest wall or heart, the progression of surface area values, or number of voxels, can initially diminish as a function of path-length and then increase. The increase in the surface area value corresponds to the segmentation front surface passing the intersection point with a different anatomical structure. If the segmentation front of a segmentation front path progress along a vessel, the corresponding surface area values can stay relatively constant (while in the vessel) and then increase when a larger anatomical structure is intersected as shown in the graph of FIG. 6. For the case of a pedunculated juxta-pleural lesion, the progression of surface area values corresponding to the pedicle structure can be constant, diminish, diminish and then increase, or just increase. However, when the corresponding segmentation front progresses past the intersection with the chest wall, the progression embarks on an approximately squared distance relationship as described above.

The segmentation front paths or sections of a given segmentation front path are classified by the manifestation of predetermined relationships between successive segmentation fronts of a given segmentation front path. The simplest method for distinguishing different types of segmentation front paths from the other types includes using thresholds, range limits, and trend lengths on the number of voxels. An alternative method involves analyzing the number of voxels in the segmentation front path to determine the rate of increase in the number of voxels as a function of the pathlength. Vessel-like structures can be identified by examining the plot of the number of voxels in each segmentation front of a segmentation front path, see FIG. 6, for regions where the number of voxels in a segmentation front is below a predetermined threshold and is approximately constant for a minimum given path length. In addition the vessel-like structures can further be identified by examining the shape parameters and directions for each segmentation front for consistency between each segmentation front and consistency with a prior vessel model. Spiculated tentacle-like structures are identified in a similar way by looking for a diminishing progression of number of voxels over a relatively short length with termination. The segmentation fronts and voxels that occur after the identified segmentation front that starts vessel-like structure are classified as vessel (or spiculated tentacle).

Lesions that are attached to large normal structures such as the pleural wall or mediastinum are identified by looking for region where the progression of number of voxels in a wave front part are increasing at a large rate for a relatively long path length, see FIG. 6. When a wave-front part progresses to the stage that it includes roughly 1000 voxels, it is very likely to have intersected with a large anatomical structure. Once this type of segmentation front path has been identified it is necessary to determine where (i.e. at which segmentation front) the intersection between the lesion and large anatomical structure has occurred. In many instances it has been observed that when the segmentation front penetrates a large anatomical structure that ratio of the number of voxels in successive segmentation front is greater than would be expected based upon a squared distance relationship. An approximate boundary between the lesion and normal anatomy is given by the aforementioned segmentation front. The segmentation fronts and voxels that occur before the identified large anatomical structure are classified as lesion type. The segmentation fronts that occur after the large anatomical structure are classified as normal anatomy. If deemed necessary more sophisticated methods can be used to demark the boundary between the lesion and normal anatomy. For example, the intersection points between the identified segmentation front and the boundary between anatomical structure and lung parenchyma can be identified and used to fit a 3 dimensional plane. The segmentation fronts and voxels that occur on the side of the plane containing the seed point are classified as lesion type. The segmentation fronts and voxels that occur on the side of the plane not containing the seed point are classified as normal anatomy and can be removed from the segmentation map.

Figure 7:
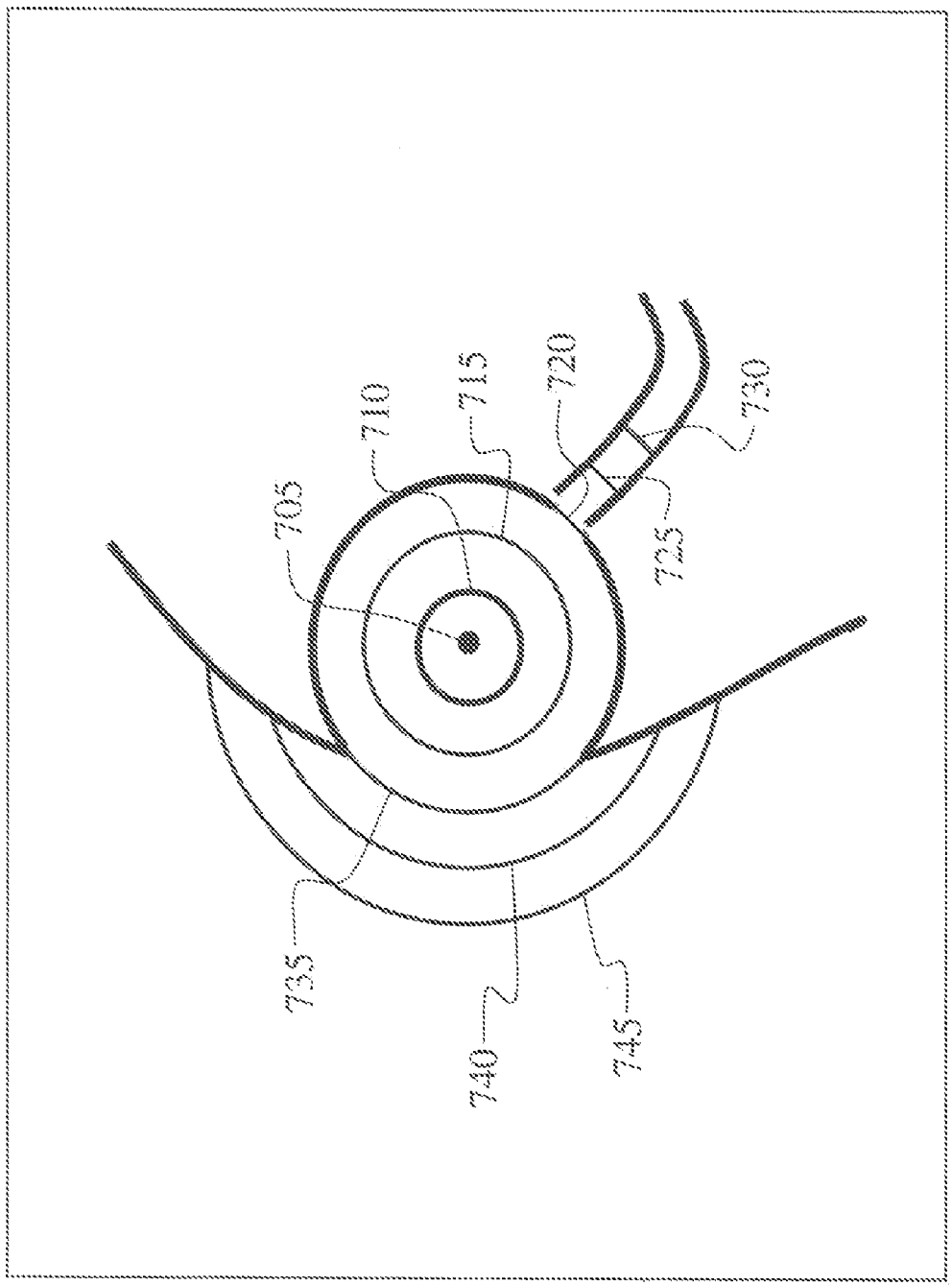
FIG. 7 is diagram showing the segmentation fronts generated by the region growing processing.
Figure 8:
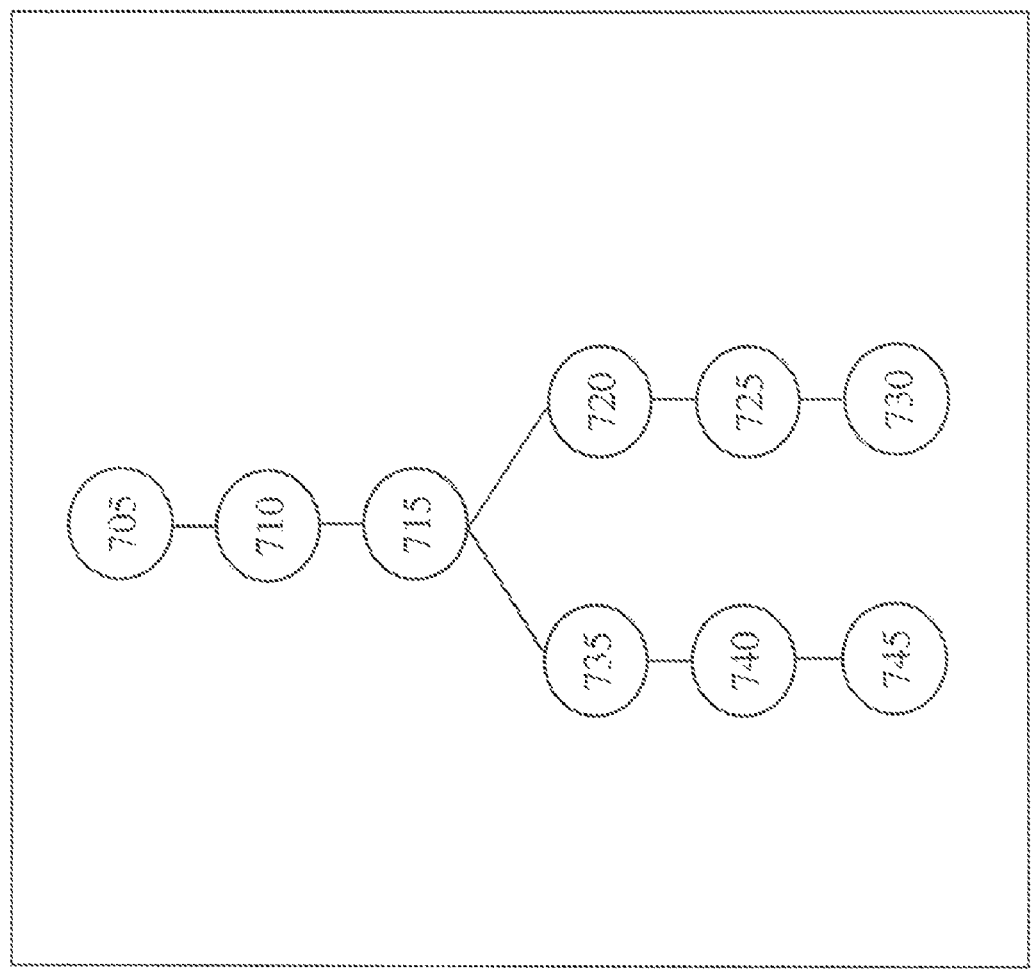
FIG. 8 shows the parent-child relationship between segmentation fronts.

FIG. 7 shows a schematic 2-dimensional representation of a lesion that is both a sessile juxta-pleural and juxta-vascular lesion and the resulting segmentation fronts produced by the initial lesion segmentor 310. The segmentation front 705, 710, 715, 735, 740, and 745 represents a single segmentation front path for a sessile juxta-pleural lesion type and segmentation fronts 705, 710, 715, 720, 725, and 730 represents a segmentation front path for a vessel. FIG. 8 shows the parent-child relationship of the segmentation fronts in the form of a tree structure where each segmentation path represents a unique path through the tree structure. The region within the initial segmentation map 203 that occurs before the segmentation front 720 and 735 is classified as lesion and the region after the segmentation front 720 is classified as vessel. The segmentation front 735 can be used to approximately demark the boundary between the lesion and the lung wall. The region within the initial segmentation map 203 after segmentation front 735 is classified as normal anatomy. Unfortunately, these methods to determine the boundary between the lesion and normal anatomy (lung wall and mediastinum) are too restrictive and often fail to produce desirable results. A primary reason is that such approaches are overly simplistic and do not account for the local geometry, or the variability of surfaces within a volume.

Figure 9B:
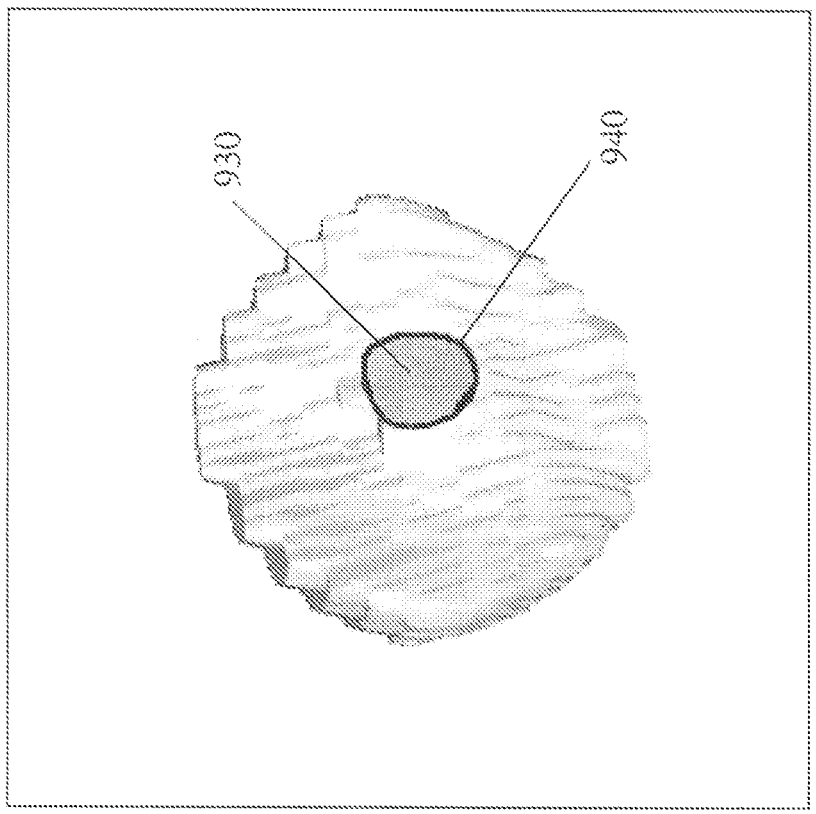
FIGS. 9a and 9b depict a 3D representation of a lesion attached to the lung wall.
Figure 9A:
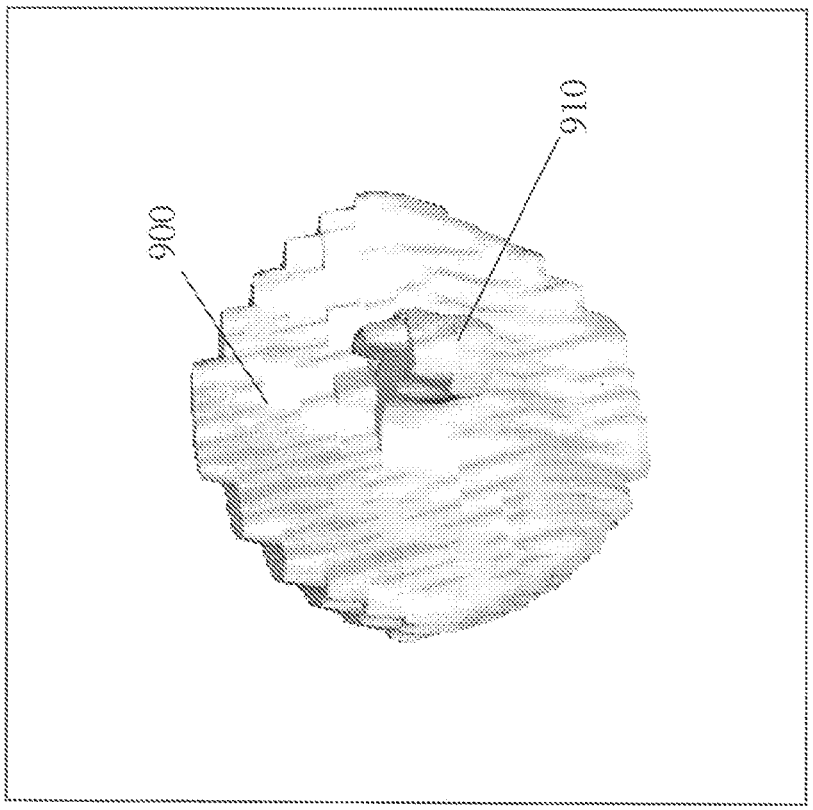

Referring to FIGS. 9a and 9b that show a 3D representation of a surface patch of the lung wall. In a healthy state the lung cavity (parenchyma) and the lung wall are adjacent and the boundary between these two is a boundary surface 900 that can be considered as topologically smooth. While this surface is smooth, it does not imply that any region on the surface can be modeled as a plane or low degree polynomial surface. If a lesion 910 is attached to this surface the region of attachment 930 can be considered as a "hole" in the normal healthy surface. The boundary of this hole is a closed non-self intersecting curve 940. It then becomes necessary to reconstruct or interpolate a surface across this hole in order to accurately determine the boundary between the lesion and lung wall. Scattered data surface reconstruction/interpolation methods can be used to reconstruct or interpolate a surface across this hole.

Surface reconstruction/interpolation using radial basis functions RBF can be used to determine the boundary between the lesion and normal anatomy for situations where a plane or a low degree polynomial surface cannot sufficiently fit the topology of the dividing surface. Traditional surface reconstruction creates a height field (or depth map) in order to fit a set of data points (see J. C. Carr, et. al., "Surface Interpolation with Radial Basis Functions for Medical Imaging," IEEE Transactions on Medical Imaging, Vol. 16, No. 1, February 1997, pp 96-107). Height fields are parametric surfaces in that two coordinates can uniquely give any position on the surface patch. Thus, height field is a single valued function of two variables (2-D) $f: \Re^2 \to \Re$, where the data at which the function values are known can be scattered, e.g., not collected on a regular grid.

The function $f$ is approximated by $g: \Re^2 \to \Re$, given the values $\{f(x_i):=1,2,\ldots,n\}$, where $\{x_i\}$ is the set of (x, y) coordinates of voxels on the boundary between the lung parenchyma and normal anatomy. The interpolating parametric function g using radial basis functions is given by $$g(x) = \sum_{i=1}^{n} w_i \phi(\|x - x_i\|) + p(x) \quad (2)$$

where $w_i$ are the weights, $x_i$ are the location of the boundary constraints (see above), $\phi(\|x-x_i\|)$ is a radial basis function centered at $x_i$, and p(x) is a low degree polynomial. The weights $w_i$ are determined by requiring that g satisfy the following $$g(x_i)=f(x_i)\ i=1,2,3,\ldots,n. \quad (3)$$

Figure 10:
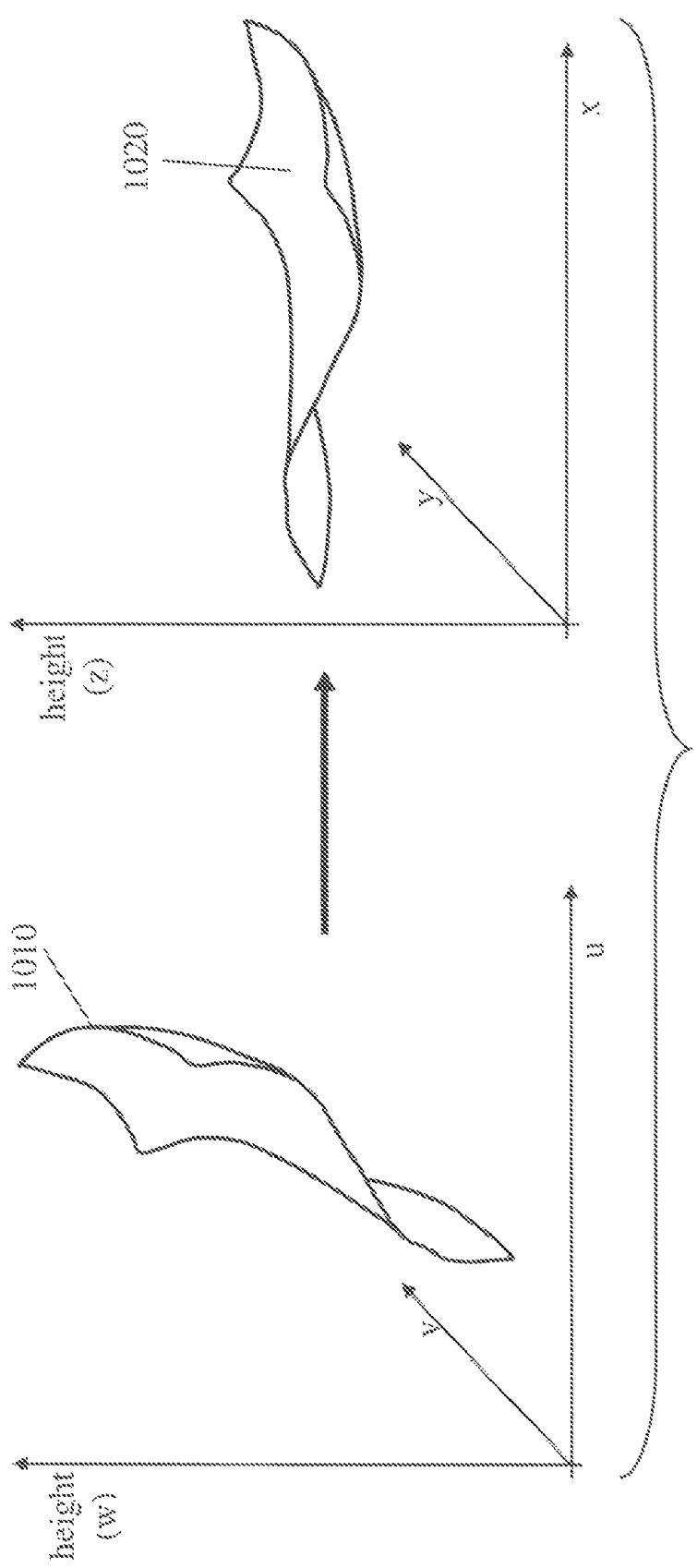
FIG. 10 depicts the transformation of the local coordinates of a surface patch.

In some situations it is necessary to transform the local coordinate system of the surface patch to ensure that the surface patch represents a single valued function and/or to maximize the domain of the surface to ensure an accurate interpolating function (see FIG. 10). For example, the surface patch 1010 represents a height field that is not singled value function with a very restricted domain. Upon transformation of the surface patch 1010 to 1020 a singled value function is obtained with a maximized domain.

Some typical examples of radial basis functions are given below:

$$\phi(r)=\exp(-\alpha r^2)$$

$$\phi(r)=r$$

$$\phi(r)=r^2 \log(r)$$

$$\phi(r)=\sqrt{r^2+c^2}$$

where a and c are positive constants.

The use of height fields is a barrier to creating surfaces of arbitrary topology, especially in cases where two coordinates cannot uniquely give any position on the surface patch (i.e. the height field is not single valued). To overcome the limitations of a parametric surface, an interpolating implicit surface method can be used to generate a boundary between the lesion and normal anatomy. Traditional interpolating surfaces use a function with a 2D domain to create a parametric surface, whereas the interpolating implicit method uses a function with a 3D domain to specify the location of the implicit surface. The implicit surface is defined as an isosurface (or level set) of a function $f: \Re^3 \to \Re$ where the surface is defined at 3D location at which $f(X)=0$. The implicit function takes on positive (negative) values for points that are below the surface or are contained within a closed surface and negative (positive) values for points above or are outside the closed surface.

The interpolating implicit function g is given by $$g(x) = \sum_{i=1}^{n} w_i \phi(\|X - X_i\|) + p(X) \quad (4)$$

where $w_i$ are the weights, $X_i$ are the 3D location of the constraints (see below), $\phi(\|X-X_i\|)$ is a radial basis function centered at $X_i$, and p(X) is a low degree polynomial.

Figure 12:
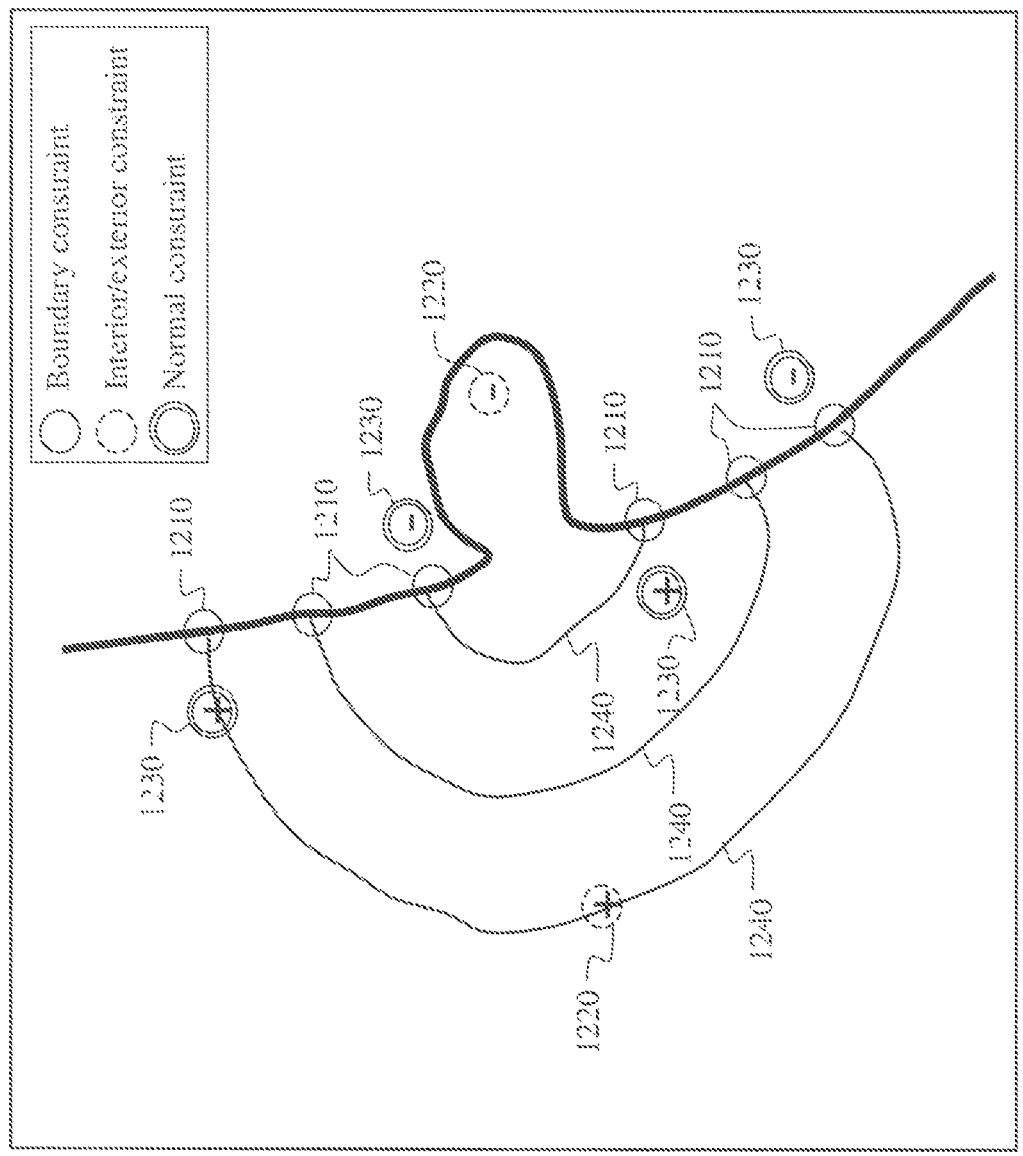
FIG. 12 depicts the 2D location of surface constraints for a lesion attached to the lung wall.

For the implicit surface method it is necessary to specify both zero value constraints (boundary) through which the surface must pass and positive (negative) interior constraints and/or negative (positive) exterior constraints in order to define the implicit function g. Alternatively, normal constraints can be paired with a subset of the boundary constraints. Normal constraints are generated by placing either a positive or negative constraint a small distance from the boundary constraint in the direction of the surface normal. The magnitude of the positive/negative constraints can be set either to +1/−1 or to it's signed distance from the closest boundary constraint. FIG. 12 shows the location of the boundary constraints 1210, interior and exterior constraints 1220 and normal constraints 1230 for a 2D slice of the lesion attached to normal anatomy. Also shown in FIG. 12 are the segmentation fronts used to generate the constraints.

The weights $w_i$ are determined by requiring that g satisfy the following $$g(X_i)=f(X_i) \; i=1,2,3,\ldots,n. \quad (5)$$

The implicit surface can be determined (see R. K. Beatson, et. al., "Fast Solution of the Radial Basis Function Interpolation Equations: Domain Decomposition Methods," SIAM Journal of Scientific Computing, Vol. 22, No. 5, 2000, pp 1717-1740) and the iso-surface of points having an interpolation value of zero can be readily extracted using a method such as Marching Cubes (see W. E. Lorensen and H. E. Cline, "Marching Cubes: A High Resolution 3D Surface Construction Algorithm," Computer Graphics, Vol. 21, No. 3, 1987, pp 163-169).

A partition of unity strategy (see O. Schall, et. al., "Surface from Scattered Points: A Brief Survey of Recent Developments," in 1st International Workshop towards Semantic Virtual Environments, Villars, Switzerland, MIRAlabs, 2005, pp 138-147) can be used to improve both the surface reconstruction accuracy and computationally efficiency of the aforementioned scattered data surface reconstruction techniques. The main idea of the partition of unity (POU) approach is to divide the global domain of interest into smaller overlapping domains where the problem is solved locally. The decomposition of the data set into smaller subsets leads to a reduction in the computational complexity of the surface fitting algorithms. Distant data samples do not contain information needed for local approximation of the surface. The surface is reconstructed on each subdomain separately, and the local surfaces are blended together using a weighted sum of the local domain solutions $$g(X) = \sum_{i=1}^{m} w_i(X) g_i(X) \quad (6)$$

where $g_i(X)$ is the locally reconstructed surface for $i=1,2,3 \ldots m$ subdomains and the weights $w_i(X)$ are smooth functions and sum up to one everywhere in the domain $$\sum_{i=1}^{m} w_i = 1.$$

Moving least squares MLS (see J. Wang and M. Olivera, "Filling Holes on Locally Smooth Surfaces Reconstructed from Point Clouds," Image and Vision Computing, Vol. 25, 2007, pp 103-113) provides another class of solution for the problem of fitting a surface to scattered data. A scattered data surface reconstruction technique closely related to partition of unity is the moving least-squares method. MLS is an extension of the well known least squares LS technique to fit a surface to a given set of data points. The term 'moving' refers to the various weighting of the points in calculating their contributions to the solution at different locations. The least squares approximation obtains a globally defined function $g(X)$ that approximates the given values $f_i$ at locations $X_i$ in at least squares sense. The function $g(X)$ is determined by the following minimization problem $$\min_{g \in \Pi_m^d} \sum_i \|g(X_i) - f_i\| \quad (7)$$

where g is taken from $\Pi_m^d$, the space of polynomials of total degree m in d spatial dimensions. The weighted least squares WLS formulation obtains a globally defined function $g(X)$ by minimizes the following:

$$\min_{g \in \Pi_m^d} \sum_i w_i \|g(X_i) - f_i\| \quad (8)$$

where the errors are weight by $w_i$. The partition of unity strategy can be applied to both the LS and WLS methods. The MLS formulation uses a WLS fit to compute and evaluate for individual points in the domain. The function $g_x(X)$ is determined at each location X by the following minimization problem $$\min_{g \in \Pi_m^d} \sum_i w_i(X) \|g_x(X_i) - f_i\| \quad (9)$$

where the weights $w_i$ is a radial function that depends upon the distance between X and the positions of the data points $X_i$. Compared to LS and WLS methods, which create a given polynomial surface, MLS computes a local polynomial fit continuously over the entire domain and blends them together. Thus, the MLS can fit the topology of higher order surfaces. The MLS method can be applied to both implicit and parameter surfaces.

Another surface useful for determining a boundary between the lesion and normal anatomy is the surface of minimal area that contains known boundary constraint voxels. This is commonly referred to as a minimal surface. The topic of minimal surfaces has a long history in mathematics and differential geometry. A means to compute such a surface (see D. L. Chopp, "Computing Minimal Surfaces via Level Set Curvature Flow," Journal of Computational Physics, Vol. 91, 1994 pp. 77-91) from a set of known boundary constraints (voxels) utilizes a computational method commonly referred to as level-set methods. The approach begins with a set of voxels on the boundary between the lung parenchyma and normal anatomy that are connected in a natural manner to form a space curve, i.e., a closed curve Γ in the 3-dimensional space. If a surface is formed with the aforementioned space curve being its boundary Γ, then the surface may represent a separation between the so-call normal tissue and tissue belonging to the lesion. However, there are an infinite number of such surfaces. One surface of particular note is such a surface with the minimal surface area, the so-called minimal surface. An equivalent property of these surfaces is that each point on the surface has zero mean curvature. An initial surface whose boundary is Γ, is evolved using mean curvature with the boundary of the evolving surface always given by Γ. The change in the surface is governed by the partial differential equation $$\frac{dx(t)}{dt} \cdot n(x(t)) = \kappa(x(t)) \quad (10)$$

where $\kappa(x(t))$ is the mean curvature at the point $x(t)$ and $n(x(t))$ is the normal of the surface at $x(t)$. The partial differential equation is solved using a level set method (see J. A. Sethian, "Level Set Methods and Fast Marching Methods", Cambridge University Press, 1999) in an iterative process that continues until convergence is reached, i.e., when the local mean curvature is zero.

Figure 11A:
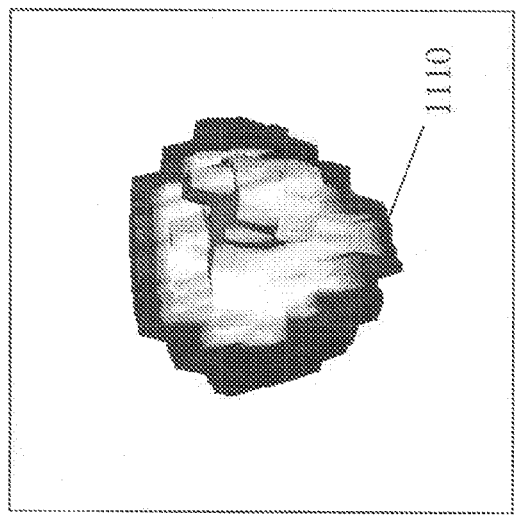
FIGS. 11a, 11b, and 11c depict a 3D representation of segmentation fronts on the lung wall.
Figure 11B:
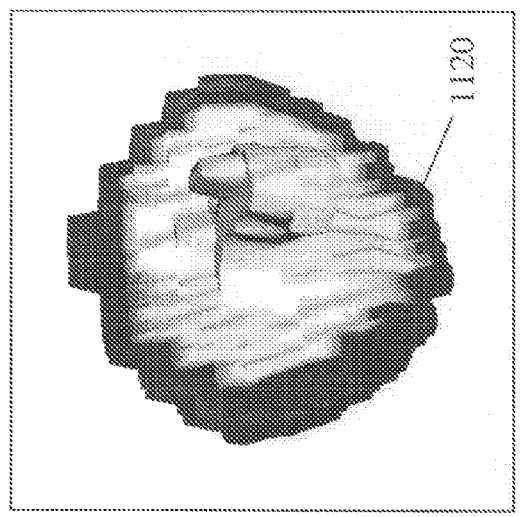
Figure 11C:
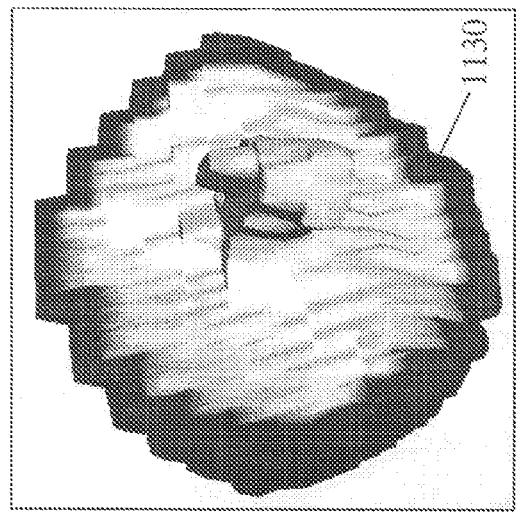
Figure 13:
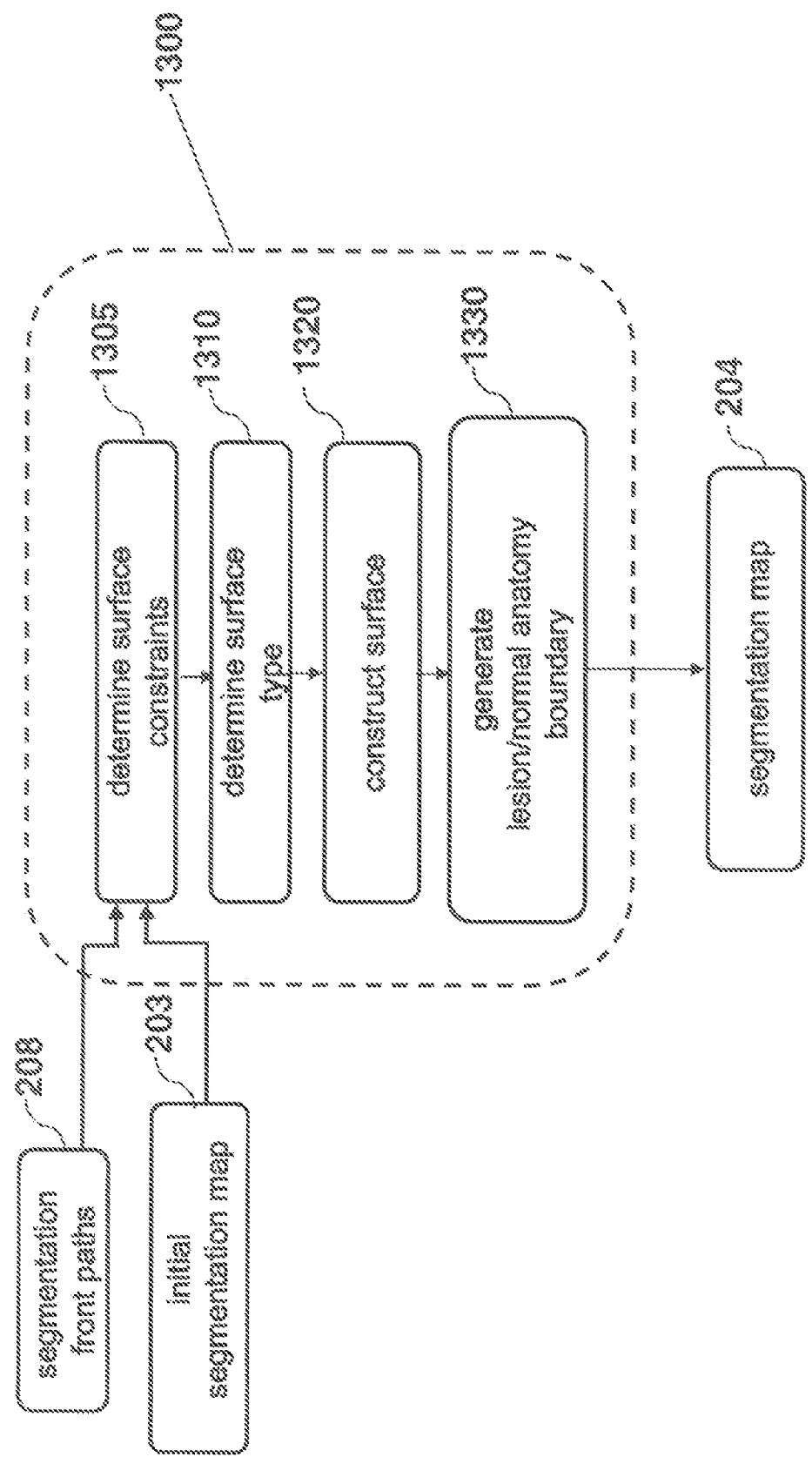
FIG. 13 is block diagram showing the details of normal anatomy/lesion separator.

If the segmentation front path analyzer 320, determines that a segmentation front path has penetrated into the normal anatomy, such as the lung wall or mediastinum, it signals the segmentation map refiner 330 to invoke normal anatomy/lesion separator 1300. The details of a potential normal anatomy/lesion separator 1300 are depicted in FIG. 13. In the determine surface constraints step 1305, the set of surface constraints, i.e. voxels, needed to generate the normal anatomy/lesion boundary surface are determined. The segmentation fronts of the aforementioned segmentation front path that have been identified as being internal to the normal anatomy are used to generate the surface constraints. Voxels associated with the identified segmentation fronts that are inactive (or frozen) form the boundary between the lung parenchyma and normal anatomy. These voxels form the set of possible surface boundary constraints. Voxels in the identified segmentation fronts that are not inactive, i.e. voxels that have been classified in the initial segmentation map, correspond to the set of possible positive constraints. Voxels neighboring the boundary constraints that have been classified as background in the initial segmentation map 203 and the initial seed point 205 correspond to the set of possible negative constraints. Normal constraints are obtained by calculating the surface normal for the boundary constraints and choosing from the set of possible negative and positive constraints voxels that are close to the boundary and are in the direction of the normal. For the minimal surface only one of the identified segmentation fronts is considered for the surface boundary constraints. The inactive (or frozen) voxels of the chosen segmentation form the boundary between the lung parenchyma and normal anatomy. These voxels can be connected in a natural manner to form a space curve, i.e., a closed curve Γ in the 3-dimensional space. FIGS. 11a, 11b, and 11c show a schematic representation of the segmentation fronts 1110, 1120, and 1130 at different path length used to generate the surface constraints. FIG. 12 shows the location of the boundary constraints 1210, interior and exterior constraints 1220 and normal constraints 1230 for a 2D slice of the lesion attached to normal anatomy. Also shown in FIG. 12 are the segmentation fronts 1240 used to generate the constraints.

For the parametric surface, the local orientation of the normal anatomy around the lesion is determined. The surface orientation is used to transform the coordinate system of the identified boundary constraint voxels so as to maximize the domain of the height field and/or form a valid height field (see FIG. 10). The appropriate orientation (transformation) can be obtained either by generating a plane whose normal is consistent with a majority the surface normal of the boundary constraints or by a eigenvector analysis of the covariance matrix of the boundary constraints locations.

The determine type of surface step 1310, determines the preferred type of surface for generating a boundary between the lesion and normal anatomy. Potential choices for the boundary surface are a segmentation front, a 3D plane, a low degree parametric polynomial, an interpolating RBF parametric, an interpolating RBF implicit, or minimal surface. The segmentation front paths are analyzed to determine which surface is appropriate. The decision is based upon a number of factors such as the confidence in the constraint data, number (density/sparsity) of boundary constraints, validity of the constraint data conforming to a singled valued height field, and the complexity/ambiguity of the connection of the nodule to the underlying surface. One indicator that the complexity/ambiguity is potentially high is when the segmentation front path analyzer 330 indicates that multiple segmentation front paths have independently connected to the surface. In a preferred implementation, the interpolating parametric or low degree parametric polynomial surface is chosen if there are a sufficient number of boundary constraints available and the height field is a single valued function. An interpolating implicit surface is preferably chosen when there are a sufficient number of constraints (boundary, interior, exterior, and normal) available and the height field is poorly behaved and/or the complexity/ambiguity of the surface is high. Alternatively, the minimal surface is preferred when the there are a sparse number of boundary constraints and/or the complexity/ambiguity of the surface is high.

In the construct surface step 1320, the aforementioned surface constraints are used to construct the appropriate surface. For the parametric or implicit surface, the interpolating parametric function g (Equation 2) or implicit surfaces the interpolating implicit function g (Equation 4) is determined and for the minimal surface the partial differential equation (Equation 6) is solved. In the generate lesion/normal anatomy boundary step 1330, the boundary surface between the lesion and normal anatomy is determined and used to modify the initial segmentation map 203 to generate the final segmentation map 204. For the aforementioned surface methods, once the boundary surface is determined, the initial segmentation map 203 is separated into at least two disjoint subsets. The voxels in the subset containing the initial seed point are classified as belonging to the lesion, while others are classified as belonging to normal anatomy. Additionally for the implicit surface method, those voxels in the segmentation map that interpolate to negative values are considered lesion voxels and those that interpolate to positive values are considered to belong to the normal anatomy.

The invention has been described in detail with particular reference to certain preferred embodiments thereof, but it will be understood that variations and modifications can be effected within the scope of the invention.

Parts List 10a image capture device
10b DR capture device
42a electronic display device
42b electronic display device
44a input control device
44b input control device
60 mobile computer
110 communications network
120 diagnostic workstation computer
140 image archive computer
150 segmentor
201 source digital images
202 volume image
203 initial segmentation map
204 segmentation map
205 seed point
206 image processing parameters 207 reported volume
208 segmentation front paths
209 rendered segmentation map
220 slice image assembler
230 lesion segmentor
240 image renderer
250 volume estimator
310 initial lesion segmentor
312 grow segmentation step
313 classify the segmentation front into active and inactive fronts step
314 partition active segmentation front into connected fronts step
315 calculate features for each connect front step
316 link connected fronts with segmentation front paths step
317 continue segmentation step
320 segmentation front path analyzer
330 segmentation map refiner
500 grid
510 current segmentation map
510a segmentation map
520 set of voxels
530 set of voxels
540 active segmentation front
540a labeled active front
540b labeled active front
550 inactive segmentation front
610 juxta-pleural lesion
620 juxta-vascular lesion
630 juxta-vascular lesion
640 lesion containing a spiculated tentacle
705 segmentation front
710 segmentation front
715 segmentation front
720 segmentation front
725 segmentation front
730 segmentation front
735 segmentation front
740 segmentation front
745 segmentation front
900 boundary surface
910 lesion
930 hole in surface
940 closed non-self intersecting curve
1010 surface patch
1020 surface patch
1110 3D segmentation front
1120 3D segmentation front
1130 3D segmentation front
1210 boundary constraint
1220 interior and exterior constraints
1230 normal constraint
1240 segmentation front
1300 normal anatomy/lesion separator
1305 determine surface constraints step
1310 determine type of surface step
1320 construct surface step
1330 generate lesion/normal anatomy boundary step

The invention claimed is:

1. A method of segmenting a lesion from normal anatomy in a 3-dimensional image comprising the steps of:
    a) receiving an initial set of voxels that are contained within the lesion to be segmented;
    b) growing an initial region which includes the lesion from the initial set of voxels;
    c) identifying within the initial region a second set of voxels on a surface of the normal anatomy;
    d) determining a surface containing the second set of voxels which demarks a boundary between the lesion and the normal anatomy within the initial region; and
    e) classifying voxels which are part of the lesion.

2. A method as in claim 1 wherein said step of growing a region comprises a segmentation front analysis.

3. A method as in claim 2 wherein segmentation front analysis comprises a fast marching method.

4. A method as in claim 2 wherein said step of identifying a second set of voxels is derived from the segmentation front analysis.

5. A method as in claim 2 wherein the demarcation boundary is determined by a scattered data surface reconstruction method.

6. A method as in claim 5 wherein the scattered data surface reconstruction is by a low degree polynomial surface.

7. A method as in claim 5 wherein the scattered data surface reconstruction is achieved by interpolating radial basis function.

8. A method as in claim 7 wherein the interpolating function is a parametric function.

9. A method as in claim 7 wherein the interpolating function is an implicit function.

10. A method as in claim 5 wherein the scattered data surface reconstruction method utilizes a partition of unity.

11. A method as in claim 5 wherein the demarcation boundary is determined using a moving least squares method.

12. A method as in claim 5 wherein the demarcation boundary is a minimal surface.

13. A method as in claim 1 wherein the demarcation boundary is determined by a scattered data surface reconstruction method.

14. A method as in claim 13 wherein the scattered data surface reconstruction is achieved by interpolating radial basis function.

15. A method as in claim 14 wherein the interpolating function is a parametric function.

16. A method as in claim 14 wherein the interpolating function is an implicit function.

17. A method as in claim 13 wherein the scattered data surface reconstruction method utilizes a partition of unity.

18. A method as in claim 13 wherein the demarcation boundary is determined using a moving least squares method or wherein the demarcation boundary is a minimal surface.

19. A method as in claim 5 wherein the scattered data surface reconstruction method is determined by the segmentation front analysis.

* * * * *